(12) United States Patent
Karppanen (10) Patent No.: US 9,304,830 B1
(45) Date of Patent: Apr. 5, 2016

(54) FRAGMENT-BASED MULTI-THREADED DATA PROCESSING

(71) Applicant: Amazon Technologies, Inc., Seattle, WA (US)

(72) Inventor: Jari Juhani Karppanen, Seattle, WA (US)

(73) Assignee: Amazon Technologies, Inc., Seatte, WA (US)

( * ) Notice: Subject to any disclaimer, the term of this patent is extended or adjusted under 35 U.S.C. 154(b) by 0 days.

(21) Appl. No.: 14/579,920

(22) Filed: Dec. 22, 2014

(51) Int. Cl.
*G06F 9/45* (2006.01)
*G06F 9/52* (2006.01)

(52) U.S. Cl.
CPC ........................................ *G06F 9/52* (2013.01)

(58) Field of Classification Search
CPC .... G06F 9/4881; G06F 9/4843; G06F 9/3851
USPC ........................................................ 718/107
See application file for complete search history.

(56) References Cited

U.S. PATENT DOCUMENTS

2005/0076169 A1* 4/2005 Modelski ................ G06F 13/36
710/100

* cited by examiner

*Primary Examiner* — John Chavis
(74) *Attorney, Agent, or Firm* — Klarquist Sparkman, LLP (57) ABSTRACT

Techniques and solutions are described for multi-threaded processing of data, which may include dividing incoming data content stream into a plurality of fragments, for processing by a corresponding plurality of parallel parser threads running within one or more computing devices. A fragment order is assigned to the plurality of fragments. During a first processing phase of the parser threads, for each of one or more selected fragments of the plurality of fragments, a first available delimiter is determined within data content of the selected fragment. The data content within the selected fragment is parsed, starting from the first available delimiter to a last available delimiter within the fragment. During a second processing phase, for each of the one or more selected fragments, data content in a fragment suffix for the selected fragment is parsed with data content from a fragment prefix from a subsequent fragment.

20 Claims, 9 Drawing Sheets

| ORDER OF COMPLETION (COMPLETION TIME) | PARSER THREAD (PT) | COMPLETION INDICATOR (CI#) | COMMIT (OUTPUT) FRAGMENT |
|---|---|---|---|
| T1 | PT2 | CI = 1 | NO |
| T2 | PT3 | CI = 1 | NO |
| T3 | PT1 | CI = 1 | YES – Fragment 1 |
|  |  | CI = 2 | YES – Fragment 2 |
|  |  | CI = 3 | YES – Fragment 3 |
| T1 | PT1 | CI = 1 | YES – Fragment 1 |
| T2 | PT2 | CI = 2 | YES – Fragment 2 |
| T3 | PT3 | CI = 3 | YES – Fragment 3 |

FRAGMENT-BASED MULTI-THREADED DATA PROCESSING

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources. The content providers (or content producers) may provide their content to the server computing device (and/or the client computing device) is one or more data content streams that have to be parsed prior to content consumption.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings.

DETAILED DESCRIPTION

The following description is directed to techniques and solutions for fragment-based multi-threaded data processing using a plurality of parser threads (e.g., plurality of parsers may be used in a parallel configuration, for parallel parsing of data). One or more computing devices (e.g., server computers, each using a plurality of parser threads) may receive incoming data content, which may be divided into variable (or equal) size, non-overlapping fragments. Each fragment may be assigned a numeric order, and each parser thread may initiate processing of the first available fragment from the beginning of remaining content (i.e., the incoming data stream). For a given parser, the parser thread may scan through the fragment and attempts to find a known delimiter, such as end-of-line marker or structure header. The data content from the beginning of the fragment up to the delimiter position may be designated as a "pending prefix". The parse thread may then proceed to parse the remaining content up to the end of the fragment (the very first fragment will have a zero-length pending prefix).

The parsing results (i.e., individual records) may be stored in a temporary cache/buffer associated with the corresponding parser thread. For a given fragment, if the data record after the last available delimiter cannot be parsed, the leftover range (i.e., from the last delimiter until the fragment end) may be marked as a "pending suffix." After each fragment has been parsed, a follow-up phase may be executed where the "pending suffix" and the "pending prefix" from two consecutive fragments are parsed using the parser associated with the fragment that has the pending suffix. The pending prefix from the next fragment is appended to the preceding fragment's suffix and remaining records are parsed and placed into the corresponding temporary cache/buffer of the parser. In a following phase, a completion indicator number (e.g., starting from the first available fragment) is used to check whether the next fragment in order is complete. If the next fragment in order is complete, the records from the fragment's temporary cache are committed and the completion indicator is set to match the first non-committed fragment.

Figure 1:
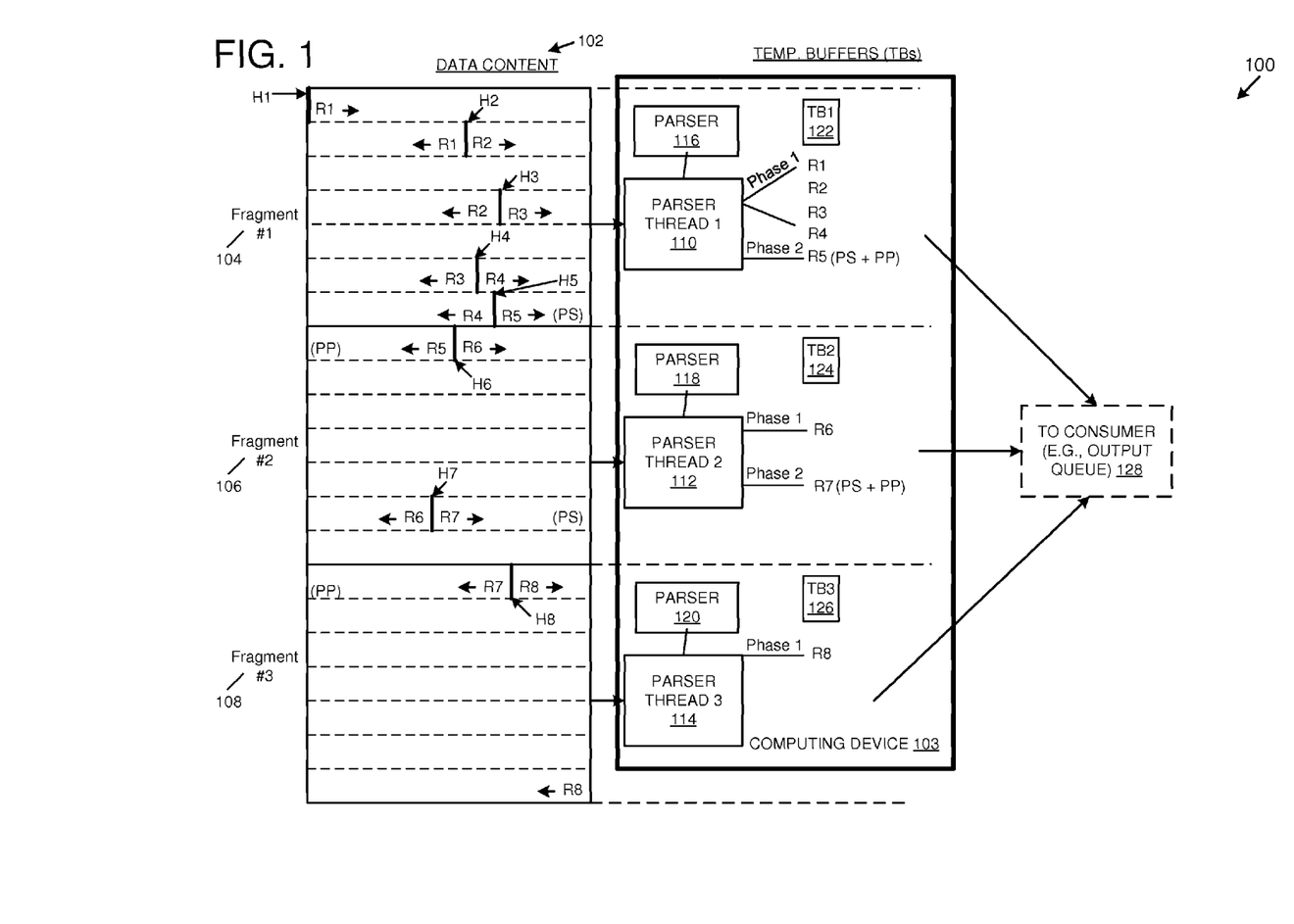
FIG. 1 is a block diagram depicting an example environment for fragment-based multi-threaded data processing, in accordance with an example embodiment of the disclosure.
Figure 7:
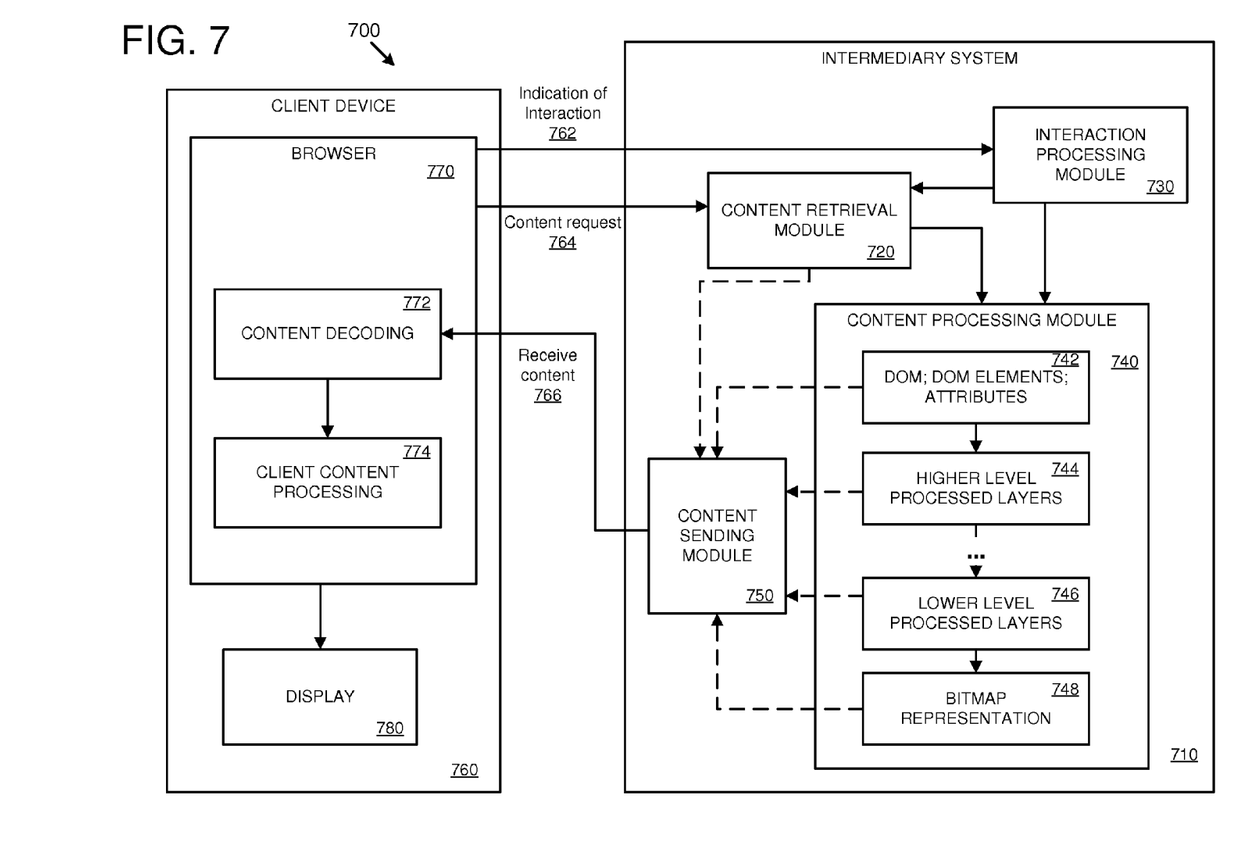
FIG. 7 is a block diagram depicting an example environment for web browsing using an intermediary system.

FIG. 1 is a block diagram depicting an example environment for fragment-based multi-threaded data processing, in accordance with an example embodiment of the disclosure. Referring to FIG. 1, the example environment 100 includes a plurality of parsers 116-120, and temporary buffers 122-124. The parsers 116-120 can be implemented in a computing device 103. The example computing device 103 can include the intermediary system 710 (comprising one or more server computers) and/or the client device 760, as illustrated in FIG. 7. The client device 760 (e.g., a laptop, desktop, notebook, phone, tablet, or other type of computing device) can run a web browser application (not depicted in FIG. 7) for loading web pages obtained, via a network from the intermediary system 710 (e.g., web servers and content servers).

Each of the parsers 116-120 may comprise suitable logic, circuitry, interfaces, and/or code and may be operable to initiate and manage a corresponding parser thread from the plurality of parser threads 110-114. Each of the parsers 116-120 may also use a corresponding temporary buffer 122-126. The parser threads 110-112 may parse data in one or more phases, as described herein. Parsed data may be stored in the corresponding temporary buffers 122-126. The temporary buffers 122-126 may be implemented using memory, one or more storage files and/or other long or short-term storage solutions.

In operation, the plurality of parsers 116-120 may use the corresponding plurality of parser threads 110-114 to perform fragment-based multi-threaded processing (e.g., parsing) of data content 102 within the computing device 103. The data content 102 may include web pages and associated resources, such as HTML, JavaScript, images, video content, and/or other web content communicated to the computing device 103 (e.g., the intermediary system 710) in response to a web page request from another client device (e.g., a client device such as 760, running a web browser application).

Figure 3A:
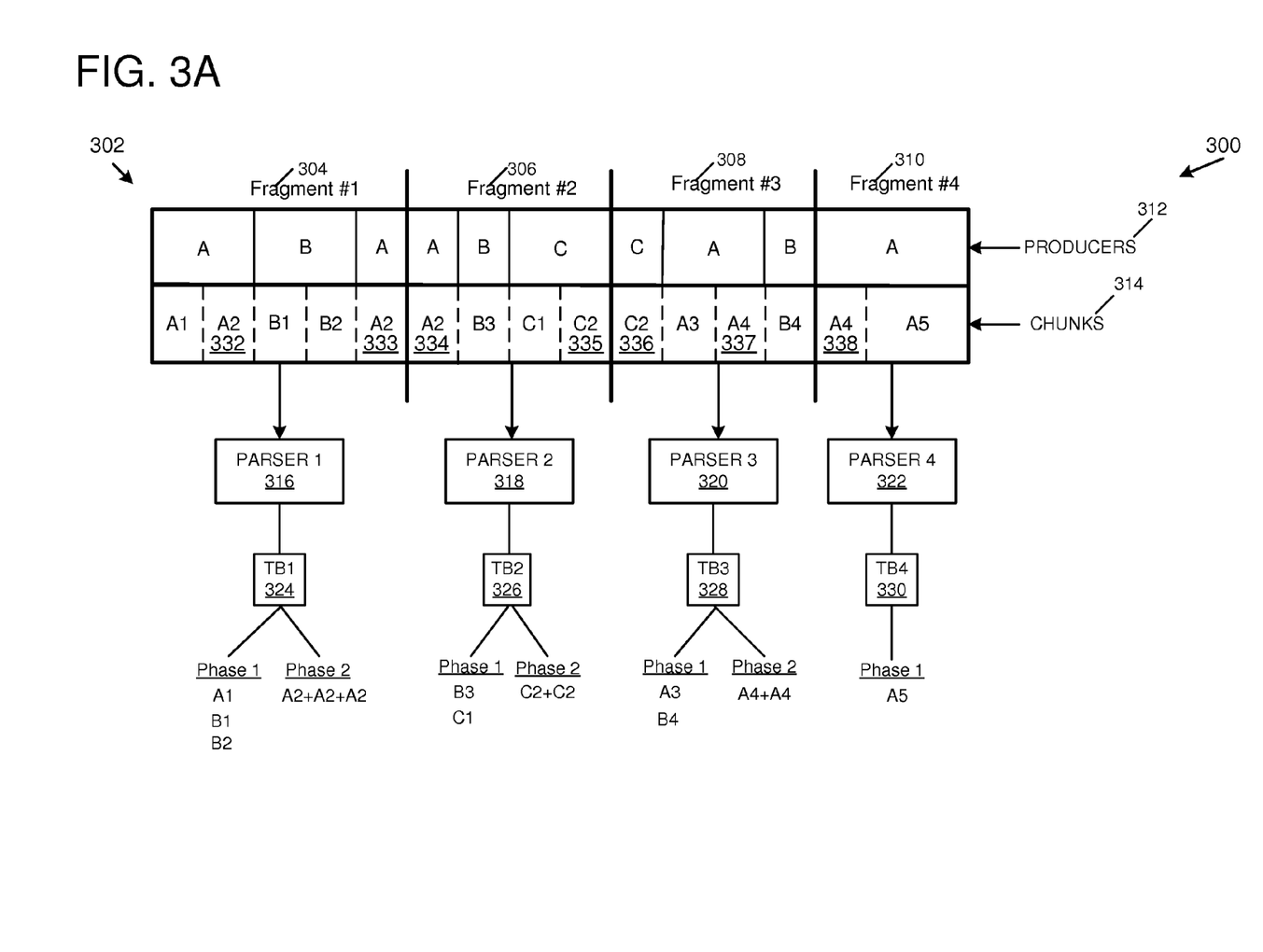
FIGS. 3A-3B are block diagrams depicting an example environment for fragment-based multi-threaded data processing of a data content stream from multiple content producers and incomplete records within multiple fragments, in accordance with an example embodiment of the disclosure.

The computing device 103 may use the parser threads 110-114 in parallel, for fragment-based multi-threaded data processing. The incoming data content 102 may be a continuous data stream. Once the data content 102 is received by the computing device 103, the data content may be divided into a plurality of fragments, such as fragments 104-108. The fragments 104-108 may be non-overlapping fragments of equal or different size (equal size fragments 104-108 are illustrated in FIG. 1). Each of the fragments 104-108 may have a plurality of chunks, which may be data records generated by a content producer (or associated with a given content consumer). In this regard, multiple consumers (or producers) can have chunks in a given fragment (as illustrated in FIG. 3A).

For fragment 104, parser thread 110 may initially locate record delimiters, such as headers H1-H5 for data records R1-R5, respectively. If any data content is located between the beginning of a fragment and the first available record delimiter, then the data content in that fragment portion is designated as pending prefix (or PP). If data content is located between the last available delimiter of a fragment and the fragment end, then the data content in that fragment portion is designated as a pending suffix (or PS). As seen in FIG. 1, for the first fragment 104 in the data content 102, the pending prefix is of zero-length since the header H1 is at the beginning of the fragment. However, a pending suffix is available for record R5, which is split between fragments 104 and 106 (data record R5 is made of the pending suffix in fragment 104 and the pending prefix in fragment 106). Similarly, a pending prefix for R5 and a pending suffix for R7 is determined by parser 118 for fragment 106, and a pending prefix for R7 is determined by parser 120 for fragment 108 (no pending suffix exists for fragment 108 since the end of record R8 coincides with the end of the fragment 108.

The parser threads 110-114 may perform content parsing in parallel, using one or more processing phases. For example and in reference to fragment 104, parser thread 110 may determine that the first available packet/record delimiter is header H1, and the last available packet delimiter is the header H5. During a first processing phase, parser thread 110 may parse through the data content between H1 and H5, which includes complete data records (or chunks) R1-R4. The parsed data records R1-R4 may then be stored in a first temporary buffer (TB) 122. In order to complete parsing the entire fragment 104, the remaining portion (i.e., pending suffix for R5) may be processed in a second processing phase. However, since record R5 includes the pending suffix in fragment 104 as well as the pending prefix in fragment 106, the pending prefix for R5 may be communicated to the parser 116 (e.g., by parser 118), so that parser thread 110 may parse the pending suffix and prefix for record R5 during the second processing phase. The parsed record for R5 may then be stored in the same temporary buffer 122. In some embodiments, parser 116 may request the pending prefix for R5 from the parser 118, or parser 116 may directly access the pending prefix for R5 from the fragment 106.

During a first processing phase, parser thread 112 may parse through the data content between H6 and H7, which includes complete data record (or chunk) R6. The parsed data record R6 may be stored in a second temporary buffer 124. Pending prefix for R5 may be communicated to parser 116 for parsing with pending suffix for R5. In order to complete parsing the entire fragment 106, the remaining portion (i.e., pending suffix for R7) may be processed in a second processing phase. However, since record R7 includes the pending suffix in fragment 106 as well as the pending prefix in fragment 108, the pending prefix for R7 may be communicated to the parser 118 (e.g., by parser 120), so that parser thread 112 may parse the pending suffix and prefix for record R7 during the second processing phase. In some embodiments, parser 118 may request the pending prefix for R7 from the parser 120, or parser 118 may directly access the pending prefix for R7 from the fragment 108.

During a first processing phase, parser thread 120 may parse through the data content between H8 and the end of fragment 108, which includes complete data record (or chunk) R8. The parsed data record R8 may be stored in a third temporary buffer 126. Pending prefix for R7 may be communicated to parser 118 for parsing with pending suffix for R7.

Even though FIG. 1 illustrates only three fragments being processed in parallel by three parser threads, the present disclosure may not be limited in this regard. More specifically, a plurality (e.g., two or more) parser threads may be used in parallel in one or more computing devices to perform the fragment-based multi-threaded data processing described herein. For example, instead of a single computing device 103, a plurality of client devices may be used, where each client device implements a plurality of parser threads so that all (or part) of the threads across all (or part) of the client devices are used to implement the fragment-based multi-threaded data processing.

Figure 2:
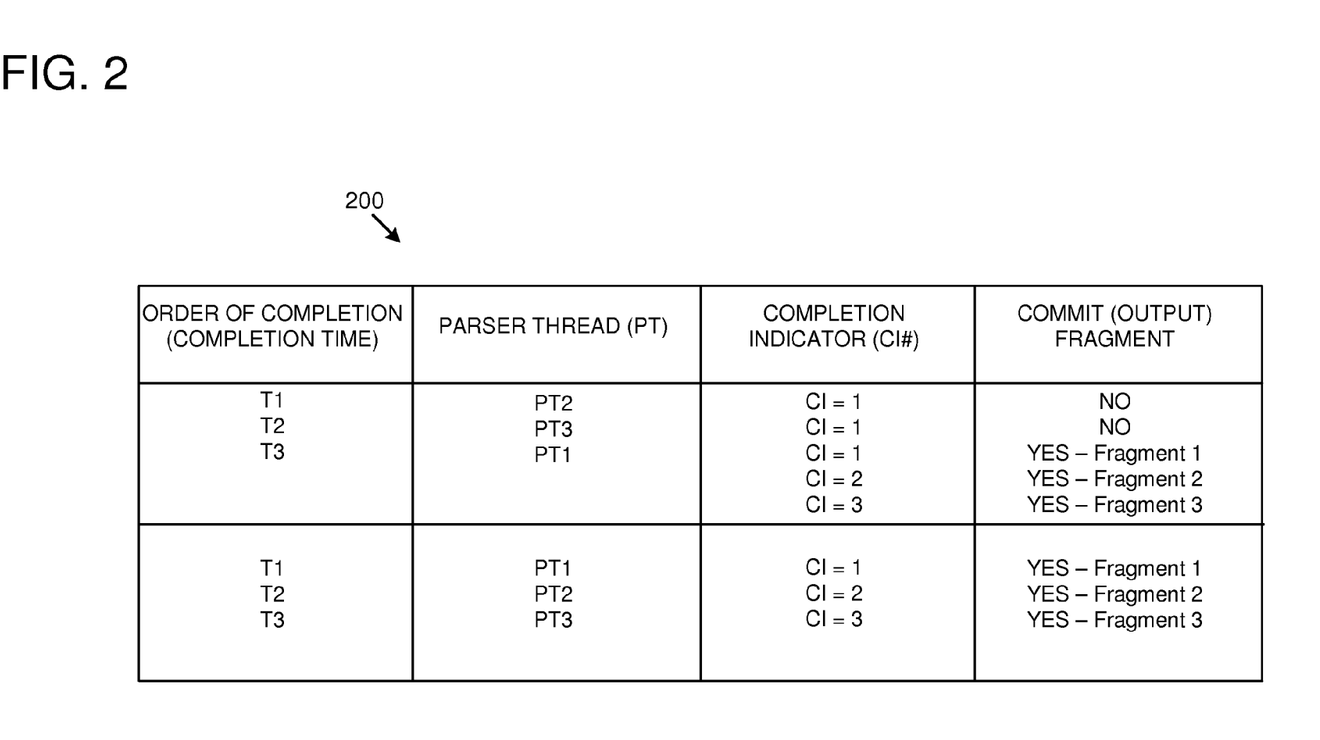
FIG. 2 is a table with example data processing scenarios with different parser thread completion times, in accordance with an example embodiment of the disclosure.

Once all records within a fragment are parsed, the processing of the fragment may be considered as complete and the parsed records within the fragment may be committed (e.g., in an order corresponding to the assigned fragment order). For example, once the first and second processing phases of parser thread 110 are complete, records R1-R5 are parsed and stored in the temporary buffer 122. A complete fragment may then be committed/communicated to a consumer (e.g., as designated by 128 in FIG. 1). For example, parsed data may be communicated/stored in an output queue, which can be a queue (or a buffer) storing parsed data for consumption by one or more data consumers. In an example embodiment, the computing device 103 may use a completion indicator (or CI, as illustrated in FIG. 2) to automatically manage communication of parsed data to the output queue 128 based on order of completion of the fragment parsing. Alternatively, the temporary buffers 122-126 may be output queues so that parsed data may be committed and communicated to consumers directly out of the temporary buffers.

In an example embodiment and as an optimization, parsed data may be committed (and communicated to consumers) even before completion of a fragment. For example, parser thread 110 may complete parsing data records R1-R4 during the first processing phase. Since parsed records R1-R4 (stored in temporary buffer 122) are complete (not partial) records, they may be committed even before phase 2 (and parsing of record R5) is complete.

FIG. 2 is a table with example data processing scenarios with different parser thread completion times, in accordance with an example embodiment of the disclosure. Referring to FIGS. 1-2, table 200 illustrates two example scenarios of multi-threaded parsing using a completion indicator. When incoming data content 102 is divided into fragments (e.g., 104-108), each fragment may be assigned a numeric ordinal, e.g., fragment 104 may be assigned #1, fragment 106 may be assigned #2, and so forth. The computing device 103 may maintain a completion indicator (CI), which may be set to match the first non-committed fragment (a non-committed fragment is fragment that is not yet complete and is not available to a consumer). As fragments are being parsed in parallel by the parsing threads 110-114, different fragments may be completed at different times. After each fragment is completed (i.e., all records within the fragment have been parsed), the completion indicator may be checked to determine if it matches the numeric ordinal of the completed fragment. If it does, then the fragment is committed and the completion indicator is incremented. In this regard, even though fragments may be completed out of order (i.e., in an order that does not match the numeric ordinals assigned when the fragments were generated), the use of the completion indicator allows for completed fragments to be committed in the order according to the pre-assigned numeric ordinals when the fragments were generated.

In the first example in table 200, completion times T1, T2, and T3 (T1<T2<T3) correspond to parser threads 112, 114, and 110, respectively (i.e., thread 112 finished first and thread 110 finished last). The completion indicator CI may be reset to 1. After thread 112 finishes first, the completion indicator is checked and fragment 106 is not committed since CI=1 and fragment 106 is assigned #2. CI (which equals 1) will match the fragment number only after the first fragment 104 (PT 1) completes. Fragment 104 (#1) can then be committed, CI is incremented (CI=2), Fragment 106 (#2) can be committed, CI is incremented (CI=3), and finally fragment 108 (#3) is committed.

In the second example in table 200, completion times T1, T2, and T3 (T1<T2<T3) correspond to parser threads PT1 (110), PT2 (112), and PT3 (114), respectively (i.e., parser thread 110 finished first and parser thread 114 finished last). The completion indicator CI may be reset to 1. After thread 110 finishes first, the completion indicator is checked and fragment 104 is committed since CI=1 and fragment 104 is assigned #1. CI is incremented so that CI=2. After PT2 (112) completes parsing, fragment 106 (#2) can be committed since CI=2. CI can be incremented again so that CI=3. After PT3 (114) completes parsing, fragment 108 (#3) can be committed since CI=3.

FIG. 3A is a block diagram depicting an example environment for fragment-based multi-threaded data processing of a data content stream from multiple content producers and incomplete records within multiple fragments, in accordance with an example embodiment of the disclosure. Referring to FIG. 3A, the example environment 300 may be similar to the environment 100 of FIG. 1. The incoming data stream 302 may be processed by a plurality of parsers (e.g., 316, ..., 322), which may be part of one or more computing devices (not illustrated in FIG. 3A). The parsers 316, ..., 322 may each implement a corresponding parser thread (also not illustrated in FIG. 3A) as well as temporary buffers TBs 324, ..., 330. As seen in FIG. 3A, a producer may have chunks in different fragments, and a given chunk may be separated (e.g., by chunks from other producers and/or by fragment separation border) into portions located within two or more different fragments.

The incoming data content stream 302 may be separated into a plurality of fragments (only four fragments 304-310 are illustrated in FIG. 3A for brevity). As seen in FIG. 3A, the data stream 302 may include chunks (or data records) 314, which may be generated by a plurality of contributors or producers 312. Data parsing may be performed in multiple phases, as described in reference to FIG. 1. More specifically, first fragment 304 may include chunks from producers A and B, with chunk A2 being separated in three parts 332-334 by chunks B1 and B2 from producer B, as well as by the separation between fragments 304-306. During a first processing phase chunk A1 from producer A and chunks B1-B2 from producer B can be parsed and stored in TB 324. The pending prefix of chunk A2 (334) may be communicated from parser 318 to parser 316 so that all three parts of chunk A2 (332-334) can be parsed in a second processing phase, and also stored in TB 324. Upon completion of parsing of the entire fragment 304 (i.e., chunks A1, B1, B2, and all parts of A2), the fragment can be committed (e.g., can be stored in an output queue for distribution to one or more consumers). Committed fragments that include chunks from different producers can be distributed to the same producers (e.g., chunks A1-A2 can be distributed to producer A, and chunks B1-B2 can be distributed to producer B). Alternatively, committed fragments may be distributed to other consumers as well.

The second fragment 306 may include chunks from producers A, B, and C, with chunk A2 334 being a pending prefix that is communicated to parser 316, and chunk C2 being separated in two parts 335-336 by the separation between fragments 306-308. During a first processing phase chunk B3 from producer B and chunk C1 from producer C can be parsed and stored in TB 326. The pending prefix of chunk C2 (336) may be communicated from parser 320 to parser 318 so that the two parts of chunk C2 (335-336) can be parsed in a second processing phase, and also stored in TB 326. Upon completion of parsing of the entire fragment 306 (i.e., chunks B3, C1, and both parts of C2), the fragment can be committed (e.g., to a consumer, as indicated by 128 in FIG. 1).

The third fragment 308 may include chunks from producers A, B, and C, with chunk C2 336 being a pending prefix that is communicated to parser 318, and chunk A4 being separated in two parts 337-338 by chunk B4 and the separation between fragments 308-310. During a first processing phase chunk A3 from producer A and chunk B4 from producer B can be parsed by parser 320 and stored in TB 328. The pending prefix of chunk A4 (338) may be communicated from parser 322 to parser 320 so that the two parts of chunk A4 (337-338) can be parsed in a second processing phase, and also stored in TB 328. Upon completion of parsing of the entire fragment 308 (i.e., chunks A3, B4, and both parts of A4), the fragment can be committed (e.g., can be communicated to a consumer as indicated by 128 in FIG. 1). The fourth fragment 310 can include chunk A5 from producer A, which can be parsed by parser 322 in a first processing phase.

Figure 3B:
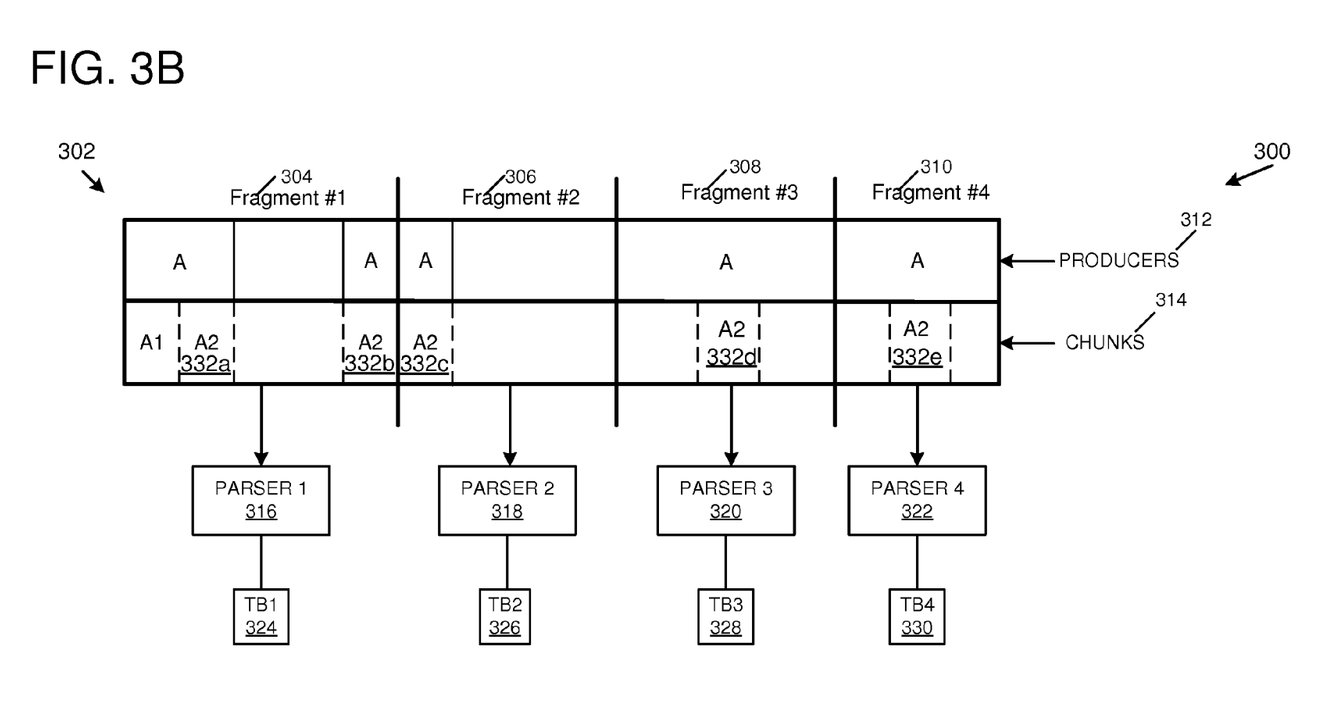

In example embodiment, parts of a given chunk may be spread over multiple fragments, and parsing of the chunk may be considered complete after all parts of the chunk are available for parsing. For example, FIG. 3B illustrates an alternative embodiment, where chunk A2 is spread over several fragments. More specifically, chunk A2 includes five portions, 332a-332e, with portions 332a-332b being within fragment 304, portion 332c being within fragment 306, portion 332d being within fragment 308, and portion 332e being within fragment 310. During the parallel parsing of fragments 304-310, as portions 332c, 332d, and 332e become available to parsers 318, 320, and 322, respectively, such portions are made available (or communicated to) the parser 316. Chunk A2 is then parsed (e.g., during a second processing phase, as described in reference to FIG. 1) by parsing all five parts 332a-332e of the chunk. In this regard, completion of parsing all parts 332a-332e of chunk A2 may take place after all fragments that have corresponding parts of the chunk (i.e., after parsing fragments 306-310).

Figure 4:
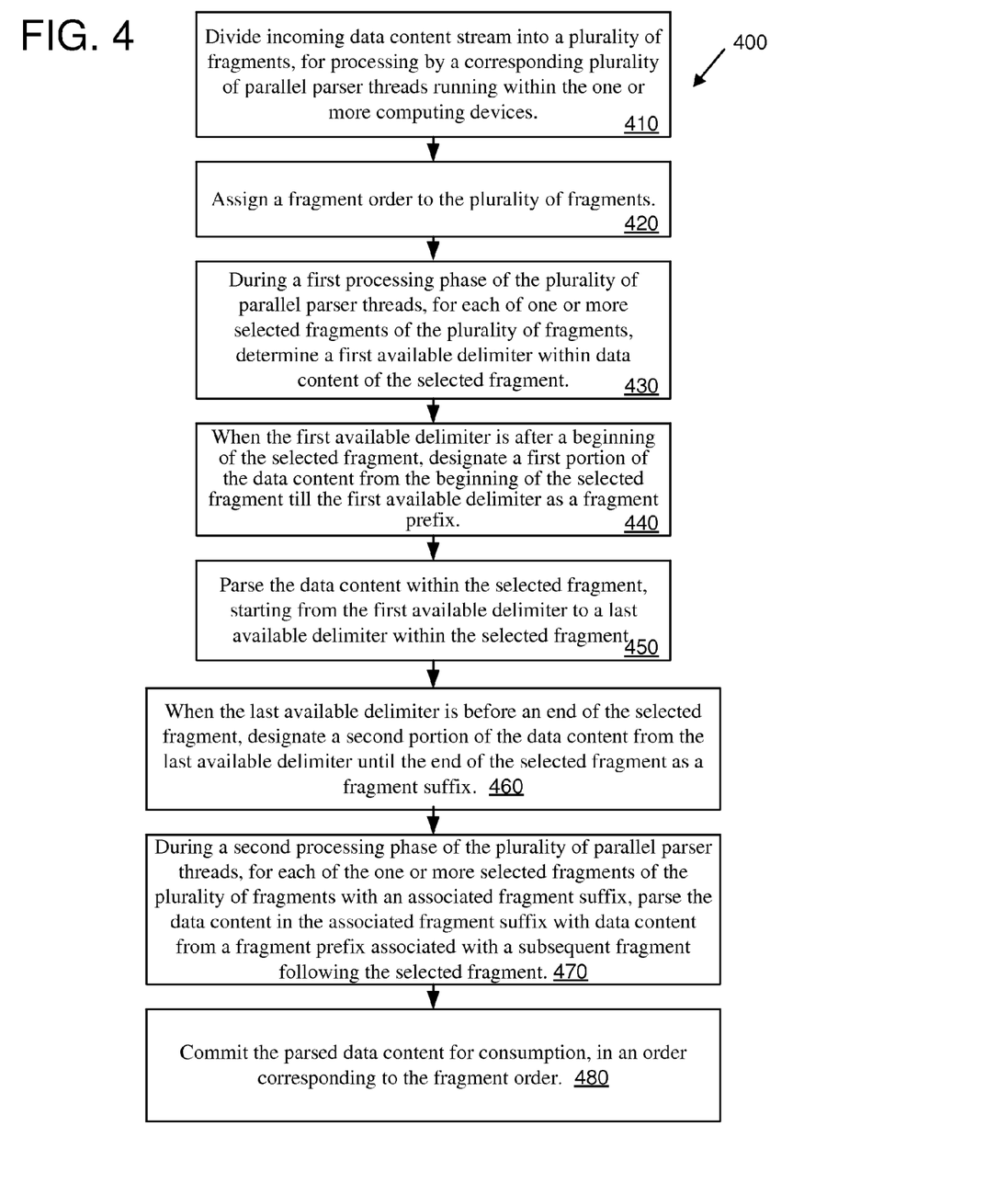
FIGS. 4, 5, and 6 are flow charts of example methods for fragment-based multi-threaded data processing, in accordance with an example embodiment of the disclosure.
Figure 5:
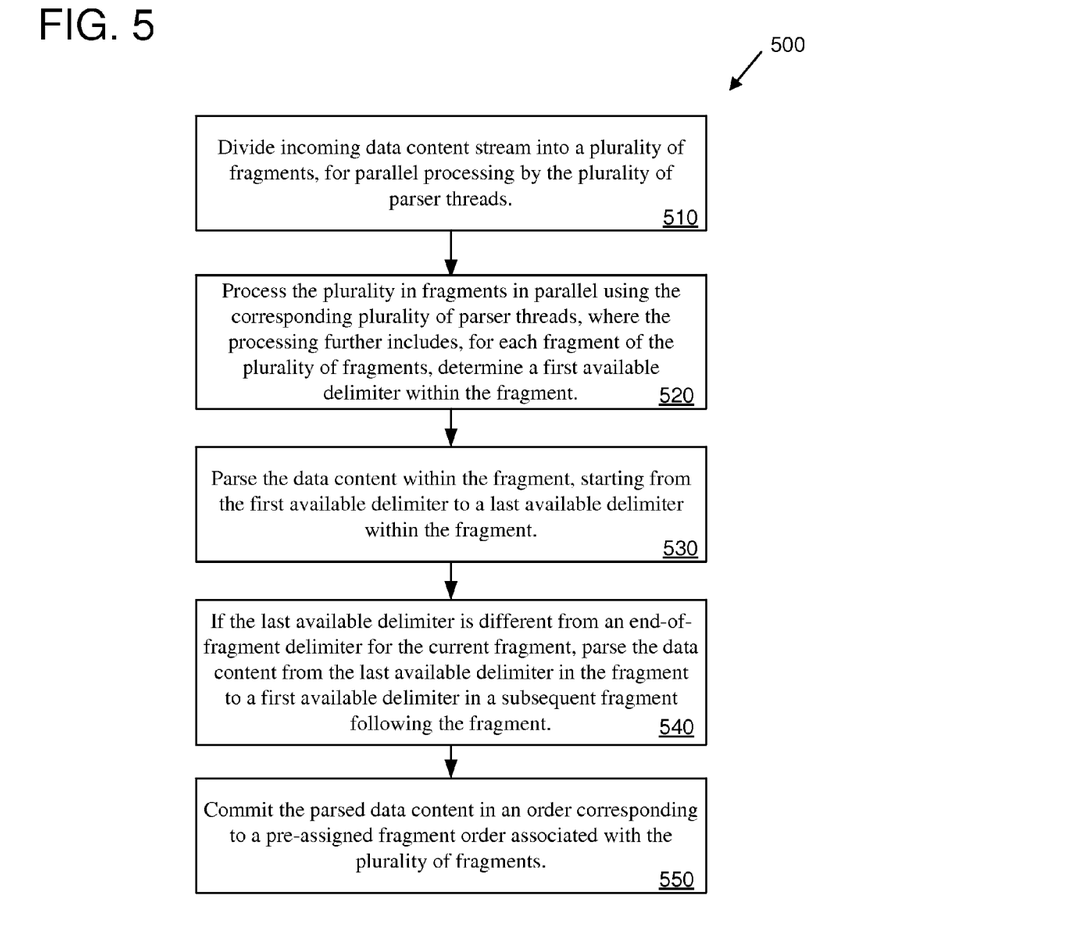
Figure 6:
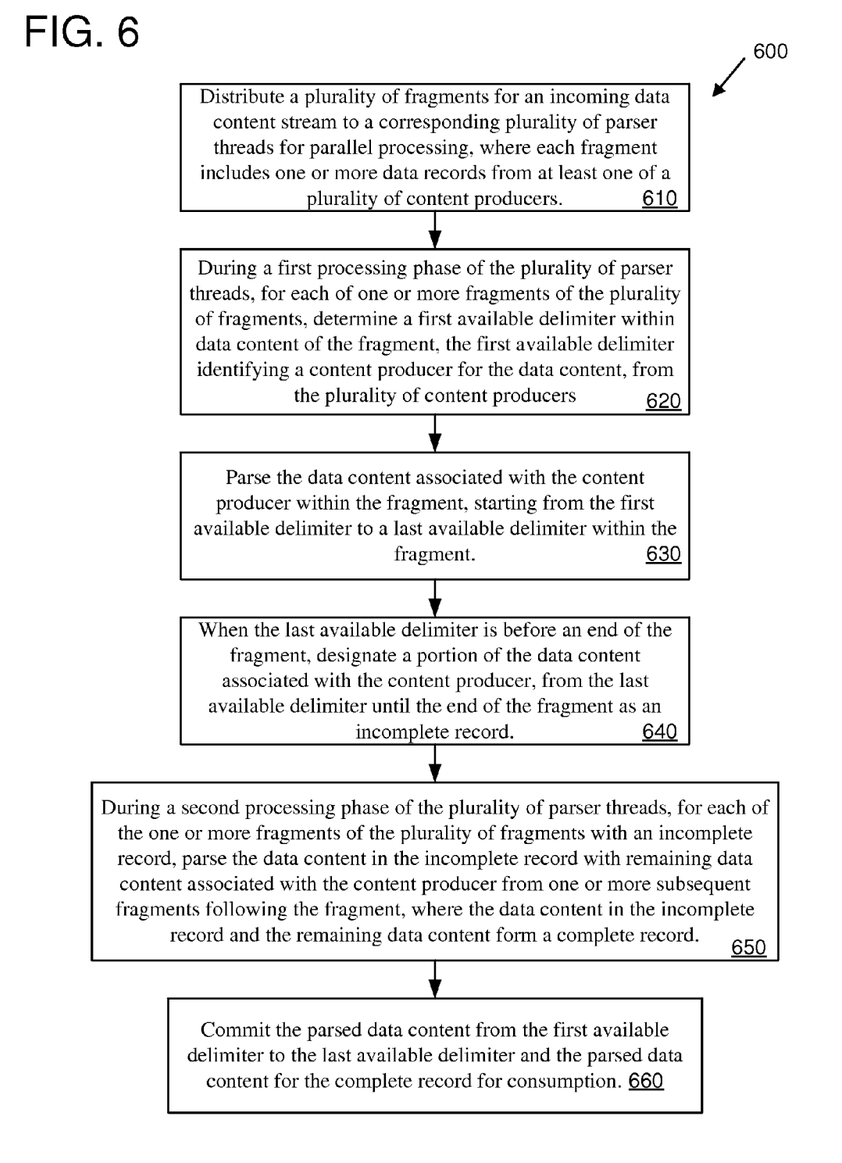

FIGS. 4, 5, and 6 are flow charts of example methods for fragment-based multi-threaded data processing, in accordance with an example embodiment of the disclosure. Referring to FIGS. 1-4, the example method 400 may start at 410 when incoming data content stream (e.g., 102) is divided into a plurality of fragments (e.g., 104-108), for processing by a corresponding plurality of parallel parser threads (e.g., 110-114 being managed by parsers 116-120, respectively) running within one or more computing devices (e.g., 103). At 420, a fragment order may be assigned to the plurality of fragments. For example, first, second and third order may be assigned to fragments 104, 106, and 108, respectively. At 430, during a first processing phase of the plurality of parallel parser threads, for each of one or more selected fragments (e.g., 104-108), a first available delimiter within data content of the selected fragment may be determined. For example, record delimiters H1-H8 may be determined for data records R1-R8 within the fragments (for fragment 106, delimiters H6 and H7 may be determined).

At 440, when the first available delimiter is after a beginning of the selected fragment, a first portion of the data content from the beginning of the selected fragment until the first available delimiter may be designated as a fragment prefix. For example, the data content portion from the beginning of selected fragment 106 until the delimiter H6 may be designated as a pending prefix for record R5. At 450, the data content within the selected fragment (e.g., 106) may be parsed, starting from the first available delimiter (e.g., H6) to a last available delimiter (e.g., H7) within the fragment. At 460, when the last available delimiter is before an end of the selected fragment, a second portion of the data content from the last available delimiter until the end of the selected fragment may be designated as a fragment suffix. For example, the data content portion from the last delimiter (H7 in fragment 106) until the end of fragment 106 may be designated as a pending suffix for data record R7. At 470, during a second processing phase of the plurality of parallel parser threads, for each of the one or more selected fragments of the plurality of fragments with a content fragment suffix, the data content in the fragment suffix and the data content from a fragment prefix associated with a subsequent fragment following the selected fragment may be parsed. For example, for the second processing phase for fragment 106, the pending suffix for record R7 can be parsed with the pending prefix for record R7, which can be obtained from parser 120 parsing fragment 108. At 480, the parsed data content (e.g., the parsed content of fragments 104-108) may be committed for output (e.g., at 128), in an order corresponding to the fragment order (i.e., first fragment 104, then fragment 106 and lastly fragment 108, which is the assigned fragment order at step 420).

Referring to FIGS. 1-3 and 5, the example method 500 may start at 510, when incoming data content stream (e.g., 102 or 302) may be divided into a plurality of fragments (e.g., 104-108 or 304-310), for parallel processing by a plurality of parser threads (e.g., 110-114 or 316-322). At 520, the plurality in fragments may be processed in parallel using the corresponding plurality of parser threads. The processing further includes, for each fragment of the plurality of fragments, determining a first available delimiter within the fragment. For example, record delimiters H1-H8 may be determined for data records R1-R8 within the fragments (for fragment 106, delimiters H6 and H7 may be determined). At 530, the data content within the fragment may be parsed, starting from the first available delimiter to a last available delimiter within the fragment. For example, data content from the first available delimiter in fragment 104 (e.g., H1) until the last available delimiter in fragment 104 (e.g., H5) may be parsed. At 540, if the last available delimiter is different from an end-of-fragment delimiter for the current fragment, the data content from the last available delimiter in the fragment to a first available delimiter in a subsequent fragment following the fragment may be parsed. For example, the last delimiter H5 in fragment 104 is not an end-of-fragment delimiter, and content from delimiter H5 until delimiter H6 in fragment 106 may be parsed (e.g., pending suffix and prefix parsing in phase 2, as seen in FIGS. 1 and 3). At 550, the parsed data content may be committed in an order corresponding to a pre-assigned fragment order associated with the plurality of fragments.

Referring to FIGS. 1-3 and 6, the example method 600 may start at 610, when a plurality of fragments for an incoming data content stream (e.g., 302) may be distributed to a corresponding plurality of parser threads (e.g., 316-322) for parallel processing. Each fragment (e.g., 304-310) may include one or more data records from at least one of a plurality of content producers (e.g., chunks 314 from content producers 312). At 620, during a first processing phase of the plurality of parser threads, for each of one or more fragments of the plurality of fragments, a first available delimiter (e.g., delimiters such as H1-H8 in FIG. 1) within data content of the fragment may be determined. The first available delimiter may identify a content producer for the data content, from the plurality of content producers. For example, the delimiter at the beginning of chunk A1 may identify A as the content producer. At 630, the data content associated with the content producer within the fragment may be parsed, starting from the first available delimiter to a last available delimiter within the fragment (e.g., record A1 may be parsed as it is a complete record within fragment 304). At 640, when the last available delimiter is before an end of the fragment, a portion of the data content associated with the content producer (from the last available delimiter until the end of the fragment) may be designated as an incomplete record. For example, chunks 332 and 333 may be designated as incomplete portions of record A2. At 650, during a second processing phase of the plurality of parser threads, for each of the one or more fragments of the plurality of fragments with an incomplete record, the data content in the incomplete record (e.g., 332 and 333) with remaining data content (e.g., 334) associated with the content producer from one or more subsequent fragments (e.g., 306) following the fragment (e.g., 304) may be parsed. The data content in the incomplete record (e.g., 332, 333) and the remaining data content (e.g., 334) make a complete record (e.g., A2). At 660, the parsed data content from the first available delimiter to the last available delimiter and the parsed data content for the complete record may be committed for consumption (e.g., at 128). For example, parsed content of chunks A1, B1, B2, and A2 (332, 333, 334) can be committed to the output buffer or queue. Alternatively, parsed content may be committed and communicated to content consumers out of the temporary buffers storing the parsed content.

FIG. 7 is a block diagram depicting an example environment 700 in which content consumption activity (e.g., web browsing) is performed by a client device 760 in communication with an intermediary system 710. For example, the intermediary system 710 can be a headless browser system that performs web browsing operations independently, or in combination with, the client device 760.

The activity shown in FIG. 7 will be discussed with respect to a request for, processing of, and interaction with a content page, such as a web page. Illustratively, the content page may be any content page hosted or offered by a content source, such as a web site. The content page may be defined, at least partially, by a base resource such as an HTML file. The base resource does not need to be a pre-existing file, but may instead be a dynamically generated stream of markup language, metadata, or other content. The base resource may reference one or more embedded resources, such as images, videos, script files, executable objects, and the like. For example, if the base resource is an HTML file, it may include tags referencing various resources including location identifiers where the resources may be obtained (e.g., local identifiers and/or external identifiers such as addresses of servers where the resources may be obtained).

As illustrated, the browser 770 of the user device 760 can send a request for content (as indicated at 764) to the content retrieval module 720 of the intermediary system 710. The request for content can be, for example, a request for a web page generated when the user selects a user-selectable option directing the browser 770 to the web page URL. The request for content may be a standardized request, such as an HTML GET request that requests a resource at a particular location. In some embodiments, the request for content may be a request for layers (e.g., for processed layers). In some embodiments, the request for content can be accompanied by data representing capabilities of client device 760, for example one or more of processing capabilities, network connection parameters, and configuration of browser 770, to name a few.

In some embodiments, when intermediary system 710 receives the request for a content page, the intermediary system 710 can assess, for the content page, whether sending the content for the page as processed layers (e.g., at one or more levels of processing) to the client device 760 will reduce a user-perceived page load time relative to at least one alternative rendering technique. In some cases, the intermediary system 710 can determine whether a layer transfer rendering technique, in which processed layers are sent, is preferable for a given page load based on a number of factors, for example the speed, bandwidth, and type of network connection of client device 760 as well as characteristics of the content site. For example, intermediary system 710 can determine or predict whether the layer transfer rendering technique will reduce a page load time and/or bandwidth consumption compared to fully rendering the content page on the browser 770 (e.g., sending original HTML and associated web resources and having the browser 770 perform all of the rendering pipeline operations) or fully rendering the content page on the intermediary system 710 (e.g., performing all of the rendering pipeline operations and sending a bitmap representation to the client device 760).

The content retrieval module 720 can retrieve the content of the content page, for example HTML and associated resources, from content sources (e.g., web servers or content servers) and/or from local storage (e.g., cache). In some implementations, the network connection between the content retrieval module 720 and the content sources may be faster than the network connection between the client device 760 and the content sources, thereby reducing latency in rendering the content page for the user. The content source may be the origin content server, a CDN server, a proxy server, or some other source.

The content processing module 740 (e.g., implementing all or part of a rendering pipeline) can receive content (e.g., web page content) from the content retrieval module 720. The content processing module 740 can construct a Document Object Model (DOM) from of the received content, as indicated at 742. For example, the DOM can be constructed by converting HTML elements and any embedded resources into DOM nodes based on a DOM definition or specification. Creating the DOM can also involve parsing any available style data, such as style data obtained from a referenced CSS file or style data included in the HTML file. The content processing module 740 can also identify and provide one or more DOM elements and/or DOM element attributes together with the DOM (as indicated at 742).

Based on the DOM, different levels of processed layers can be generated, which can include higher level processed layers 744, lower level processed layers 746 and any processed layers in-between. While two levels of processed layers are depicted (744 and 746), different implementations can have more or fewer levels of processed layers. Different layers of a content page can encompass different two-dimensional areas of the content page (for example, cover different ranges of coordinates without overlapping). In some cases, one layer may partially or completely overlap another layer (for example, a background layer may be partially overlapped by any number of other layers, each of which may partially or completely overlap other layers, etc.). The content processing module 740 can also create a bitmap representation of the content (e.g., the web page) using the processed layers, as depicted at 748. Depending on the specific configuration being used, the content processing module 740 can create information for one or more of the levels of processing (e.g., 742, 744, 746, and/or 748). For example, the content processing module 740 may process the content to create a DOM (as depicted at 742) and a higher level processed layer (as depicted at 744) without any additional processing (e.g., without proceeding to lower level processed layers or bitmaps, as depicted at 746 and 748).

The intermediary system 710 supports sending content to the client device 760 at different levels of processing. For example, the content sending module 750 can receive raw content (e.g., original HTML content and associated resources) form the content retrieval module 720. The content sending module 750 can receive DOM information from the content processing module 740. The content sending module 750 can receive different levels of processed layers from the content processing module 740. The content sending module 750 can receive bitmap images from the content processing module 740. These different sources of content are indicated by the dashed lines within the intermediary system 710. Depending on the specific configuration being used, the content sending module 750 may receive content from one or more levels of processing (e.g., the content sending module 750 may only receive lower level processed layers for sending to the client device 760).

The content sending module 750 can encode the received content for sending to the client device 760. For example, the content sending module 750 can encode layers using a variety of layer encoding techniques and can examine the content of an individual layer to determine which encoding technique to use (e.g., to minimize bandwidth or page load time, for compatibility with a particular client device, etc.).

When the client device 760 receives the content from the content sending module 750 (as indicated at 766), the browser 770 decodes the content, as indicated at 772. Decoding the content can involve performing one or more decoding techniques corresponding to the encoding techniques used to encode the content.

The browser 770 can perform client content processing, as depicted at 774. For example, the browser 770 can perform processing operations similar to, or the same as, those performed by the content processing module 740. The type of processing performed by the browser 770 can depend on the level of processing performed by the intermediary system 710. For example, if the content processing module 740 created a DOM and then a higher level processed layer (e.g., a render layer tree) and sent the higher level processed layer to the client device 760, then the browser 770 could complete the processing by creating lower level processed layers (e.g., a graphics layer tree and a composited layer tree) and bitmaps for display, as depicted at 780 (e.g., in cooperation with a GPU of the client device 760, not depicted).

In some embodiments, the browser 770 performs content processing, as depicted at 774, to create decoded layers that can be provided to a layer compositor (not depicted) for generating instructions for display to display (as depicted at 780) a visual representation of the content page based on the layers. For example, a layer tree can be constructed so that the layers will be decoded and provided to the layer compositor in an order in which the layers should be rendered. For example, the layer compositor can assemble the decoded layers in the proper positioning and in the proper order (e.g., with a background layer behind other layers, foreground layers covering background layers with overlapping coordinates and with an interactivity layer in front of the layers). The layer compositor can use the assembled layers to generate instructions to configure to display a visual representation of the content page.

The browser 760 can also detect user interaction with elements of the displayed content (e.g., user-selectable user-interface elements such as buttons and menus, scrolling, zooming, etc.) and send indications of user interaction to the interaction processing module 730, as indicated at 762. The browser 770 can also be configured to perform local rendering updates in some embodiments. As discussed above, a layer can be generated corresponding to a scrollable portion of the content page. Accordingly, the browser 770 can use the scrollable layer data to locally handle scrolling through the layer by updating the portion of the scrollable layer content that is displayed in the viewport, or boundary, of the scrollable layer. The browser 770 can also detect changing graphical content, for example in a GIF or video, and send a request for updated content to the intermediary system 710 if needed. In some embodiments the browser 770 may have received a URL corresponding to video content from the intermediary system 710, and accordingly may be able to handle the update to the portion of the content page including the video without sending a request to the intermediary system 710.

For any interactions that are not able to be handled locally by the browser 770 using the received content, the browser 770 can send the indications of user interaction, as depicted at 762, to the interaction processing module 730. The interaction processing module 730 can determine whether any updates to the visual representation of the content page are necessitated by the user interaction with the elements of the content. For example, the interaction processing module 730 can communicate with the content retrieval module 720 to obtain new or update content. The interaction processing module 730 can also communicate with the content processing module 740 to perform processing of content (e.g., an update to the DOM, an update to one or more processing layers, etc.) for sending back to the client device 760 in response to the interaction.

In some implementations, example environment 700 supports fragment-based multi-threaded data processing. For example, the intermediary system 710 and/or the client device 760 may perform the functionalities discussed in reference to FIGS. 1-3. More specifically, the intermediary system 710 may be the same as the computing device 103, implementing the multi-threaded parsing functionalities described in reference to FIGS. 1-3. Alternatively, parsing functionalities illustrated in FIGS. 1-3 may also be implemented as part of the client device 760.

Figure 8:
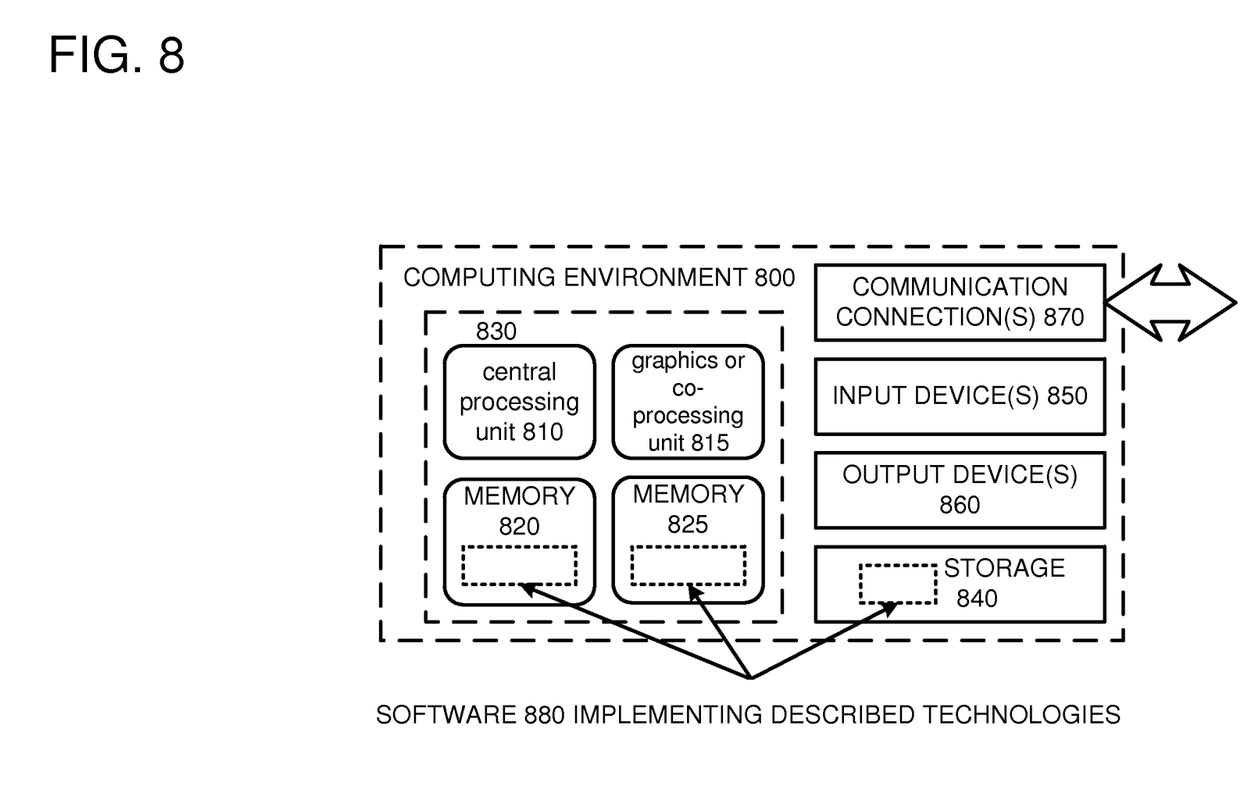
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a touch display or touchpad, a keyboard, a mouse, a pen, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented at least in part by one or more computing devices, for multi-threaded processing of data, the method comprising:
dividing incoming data content stream into a plurality of fragments, for processing by a corresponding plurality of parallel parser threads running within the one or more computing devices;
assigning a fragment order to the plurality of fragments;
during a first processing phase of the plurality of parallel parser threads, for each of one or more selected fragments of the plurality of fragments:
determining a first available delimiter within data content of the selected fragment;
when the first available delimiter is after a beginning of the selected fragment, designating a first portion of the data content from the beginning of the selected fragment until the first available delimiter as a fragment prefix;
parsing the data content within the selected fragment, starting from the first available delimiter to a last available delimiter within the selected fragment; and
when the last available delimiter is before an end of the selected fragment, designating a second portion of the data content from the last available delimiter until the end of the selected fragment as a fragment suffix;
during a second processing phase of the plurality of parallel parser threads, for each of the one or more selected fragments of the plurality of fragments with an associated fragment suffix:
parsing the data content in the associated fragment suffix with data content from a fragment prefix associated with a subsequent fragment following the selected fragment; and
committing the parsed data content for consumption, in an order corresponding to the fragment order.

2. The method according to claim 1, further comprising:
resetting a completion indicator to match a first one of the plurality of fragments arranged according to the fragment order, that is non-committed to a data content consumer.

3. The method according to claim 2, further comprising:
for each of the one or more fragments of the plurality of fragments:

storing the data content for the selected fragment parsed during the first and second processing phases into one of a plurality of temporary buffers, wherein each of the plurality of temporary buffers is associated with a corresponding one of the plurality of parser threads.

4. The method according to claim 3, further comprising:
verifying parsing the data content from the beginning of the selected fragment until the end of the selected fragment is complete.

5. The method according to claim 4, further comprising:
upon verifying parsing the data content is complete and when the completion indicator matches the selected fragment with the parsed data content, committing the parsed data content for consumption by the data content consumer.

6. The method according to claim 5, further comprising:
if the selected fragment is not a last one of the plurality of fragments arranged according to the fragment order, resuming storing data content for the subsequent fragment.

7. A computing device, comprising:
one or more processing units running a plurality of parser threads;
a memory coupled to the one or more processing units; and
one or more network interfaces;
the computing device configured to perform operations for multi-threaded processing of data, the operations comprising:
dividing an incoming data content stream into a plurality of fragments, for substantially parallel processing by the plurality of parser threads;
processing the plurality of fragments substantially in parallel using the corresponding plurality of parser threads, wherein the processing further comprises, for each fragment of the plurality of fragments:
determining a first available delimiter within the fragment;
parsing the data content within the fragment, starting from the first available delimiter to a last available delimiter within the fragment; and
if the last available delimiter is different from an end-of-fragment delimiter for the current fragment, parsing the data content from the last available delimiter in the fragment to a first available delimiter in a subsequent fragment following the fragment; and
committing the parsed data content in an order corresponding to a pre-assigned fragment order associated with the plurality of fragments.

8. The computing device of claim 7, the operations further comprising:
assigning a fragment order to the plurality of fragments to obtain the pre-assigned fragment order.

9. The computing device of claim 7, wherein the plurality of fragments comprise non-overlapping fragments of equal size.

10. The computing device of claim 7, wherein the determining of the first available delimiter and the parsing of the data content from the first available delimiter to the last available delimiter takes place during a first processing phase of the plurality of parser threads.

11. The computing device of claim 7, wherein the parsing of the data content from the last available delimiter in the fragment to the first available delimiter in the subsequent fragment takes place during a second processing phase of the plurality of parser threads.

12. The computing device of claim 7, wherein the processing further comprises:
when the first available delimiter is after a beginning of the fragment, designating a first portion of the data content from the beginning of the fragment until the first available delimiter as a fragment prefix.

13. The computing device of claim 12, wherein the processing further comprises:
designating a second portion of the data content from the last available delimiter until the end of the fragment as a fragment suffix.

14. The computing device of claim 13, wherein the processing further comprises:
providing the fragment prefix to one of the plurality of parser threads parsing data content in a preceding fragment.

15. The computing device of claim 7, wherein the processing further comprises:
writing the plurality of fragments with parsed data content in an output queue according to the pre-assigned fragment order.

16. A computer-readable storage media storing computer-executable instructions for performing operations for multi-threaded processing of data, the operations comprising:
distributing a plurality of fragments for an incoming data content stream to a corresponding plurality of parser threads for substantially parallel processing, wherein each fragment comprises one or more data records from at least one of a plurality of content producers;
during a first processing phase of the plurality of parser threads, for each of one or more fragments of the plurality of fragments:
determining a first available delimiter within data content of the fragment, the first available delimiter identifying a content producer for the data content, from the plurality of content producers;
parsing the data content associated with the content producer within the fragment, starting from the first available delimiter to a last available delimiter within the fragment; and
when the last available delimiter is before an end of the fragment, designating a portion of the data content associated with the content producer, from the last available delimiter until the end of the fragment as an incomplete record;
during a second processing phase of the plurality of parser threads, for each of the one or more fragments of the plurality of fragments with an incomplete record: parsing the data content in the incomplete record with remaining data content associated with the content producer from one or more subsequent fragments following the fragment, wherein the data content in the incomplete record and the remaining data content within the one or more subsequent fragments comprise a complete record; and
committing the parsed data content from the first available delimiter to the last available delimiter and the parsed data content for the complete record for consumption.

17. The computer-readable storage media according to claim 16, wherein the operations further comprise:
dividing the incoming data content stream into the plurality of fragments, for substantially parallel processing by the corresponding plurality of parallel parser threads.

18. The computer-readable storage media according to claim 16, wherein the operations further comprise:
writing the parsed data content from the first available delimiter to the last available delimiter in a temporary buffer associated with one of the plurality of parser threads parsing the data content.

19. The computer-readable storage media according to claim 18, wherein the operations further comprise: upon completion of parsing the data content in the incomplete record with the remaining data content, committing the parsed data content from the first available delimiter to the last available delimiter and the parsed data content for the complete record for consumption, the committing according to a pre-assigned fragment order.

20. The computer-readable storage media according to claim 16, wherein the operations further comprise: assigning a fragment order to the plurality of fragments, wherein the plurality of fragments comprise non-overlapping fragments of equal size; and upon committing data content from one of the plurality of fragments parsed by one of the plurality of parser threads, supplying unparsed data content from at least another one of the plurality of fragments to the one of the plurality of parser threads for substantially parallel processing.

* * * * *